United States Patent [19]

Nagumo et al.

[11] Patent Number: 4,854,360
[45] Date of Patent: Aug. 8, 1989

[54] PNEUMATIC RADIAL TIRE ARRANGEMENT FOR VEHICLE

[75] Inventors: Tadanobu Nagumo; Sadakazu Takei; Yukio Tozawa, all of Hiratsuka, Japan

[73] Assignee: The Yokohama Rubber Co., Ltd., Tokyo, Japan

[21] Appl. No.: 75,023

[22] Filed: Jul. 13, 1987

[30] Foreign Application Priority Data

Jul. 25, 1986 [JP] Japan ................. 61-173711

[51] Int. Cl.$^4$ ............................................. B60C 9/26
[52] U.S. Cl. ................................................. 152/529
[58] Field of Search ............... 152/529, 528, 536, 535, 152/560; 301/39 R, 5 R

[56] References Cited

U.S. PATENT DOCUMENTS

| | | | |
|---|---|---|---|
| 3,863,695 | 2/1975 | Mirtain | 152/529 X |
| 3,980,118 | 9/1976 | Kinas | 152/209 A |
| 4,335,771 | 6/1982 | Reuter | 152/529 |

FOREIGN PATENT DOCUMENTS

| | | | |
|---|---|---|---|
| 0060210 | 9/1982 | European Pat. Off. | 152/529 |
| 2453892 | 5/1976 | Fed. Rep. of Germany | 152/528 |
| 1404892 | 9/1975 | United Kingdom | 152/529 |

Primary Examiner—Raymond Hoch
Attorney, Agent, or Firm—Armstrong, Nikaido, Marmelstein, Kubovcik & Murray

[57] ABSTRACT

A pneumatic radial tire arrangement for a vehicle wherein each tire has a belt structure formed of two belt layers respectively made of steel cords and aromatic polyamide fiber cords and which have their edge portions folded back. Each tire is mounted to the vehicle with the folded back portion of the steel cord belt layer located towards the outer side of the vehicle to reduce steering pull during high speed performance of the vehicle.

2 Claims, 3 Drawing Sheets

PNEUMATIC RADIAL TIRE ARRANGEMENT FOR VEHICLE

BACKGROUND OF THE INVENTION

In order to improve the high speed performance of a radial tire, proposals have heretofore been made on tires having a folded belt structure in which both ends of a belt layer of a tire are folded back towards the tread side to form a belt portion, e.g., belt structures as shown in FIGS. 2, 3, and 4 which are typical cross-sectional view thereof.

However, tires having these folded belt structures are poor in balance in respect of high speed performance and durability, driving stability, and riding comfort and are disadvantageously large in ply steer, which makes it difficult to control the steering wheel.

SUMMARY OF THE INVENTION

An object of the present invention is to provide a radial tire which is freed from the above-mentioned problems inherent to tires having a folded belt structure. More particularly, the object of the present invention is to provide a pneumatic radial tire which is excellent in the balance in respect of high speed performance and durability driving stability and ridding comfort and, at the same item, as a decreased ply steer which is a factor causative of the occurrence of steering pull, through modification and improvement in the belt portion.

DETAILED DESCRIPTION OF THE PREFERRED EMBODIMENT

The present invention will now be described in detail by way of preferred embodiments with reference to the accompanying drawings.

Figure 1:
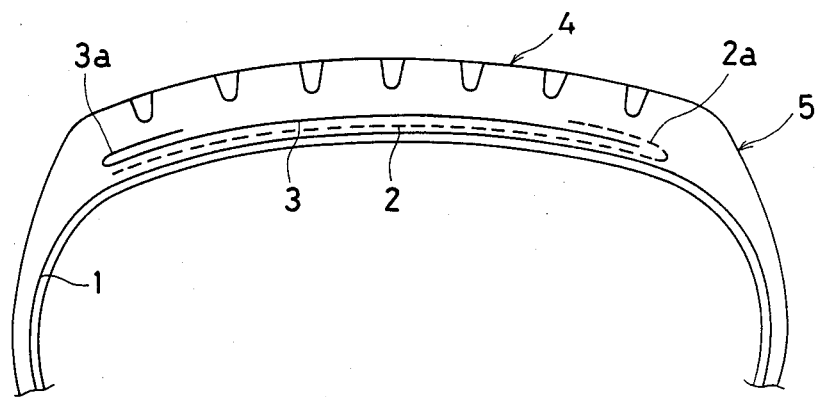
FIG. 1(A) is a cross-sectional view in the radial direction of one form of the pneumatic radial tire according to the present invention.
FIG. 1(B) is a typical view of a folded structure of a belt layer constituting a belt portion of the pneumatic radial tire as shown in FIG. 1(A)
Figure 1:
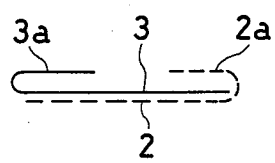
Figure 2:
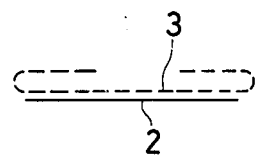
FIGS. 2 to 4 are each a typical view of a folded structure of a belt layer constituting a belt portion of a conventional pneumatic radial tire.
Figure 3:
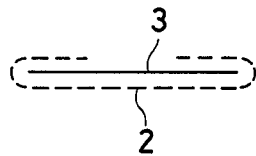
Figure 4:
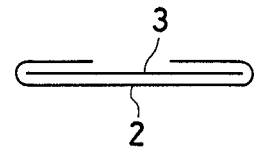
Figure 5:
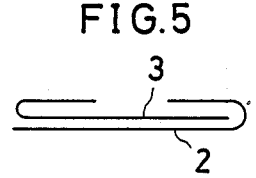
FIGS. 5 and 6 are each a typical cross-sectional view of a belt portion of a comparative pneumatic radial tire shown for comparison purpose.
Figure 6:
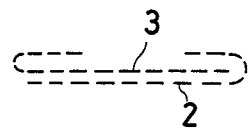
Figure 7:
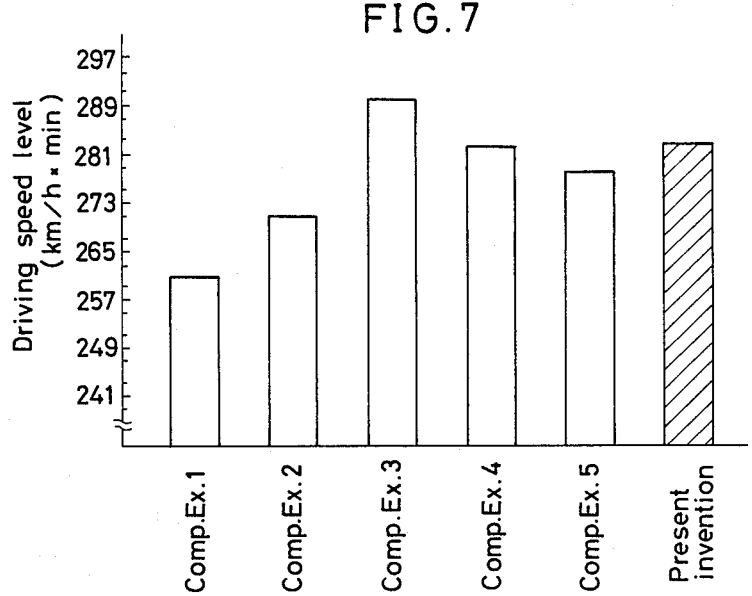
FIGS. 7, 8, 9 and 10 are graphs respectively showing a travelling level, a driving stability index, a vibration riding comfort index, and a ply steer regarding various tires having different belt portion structures.
Figure 8:
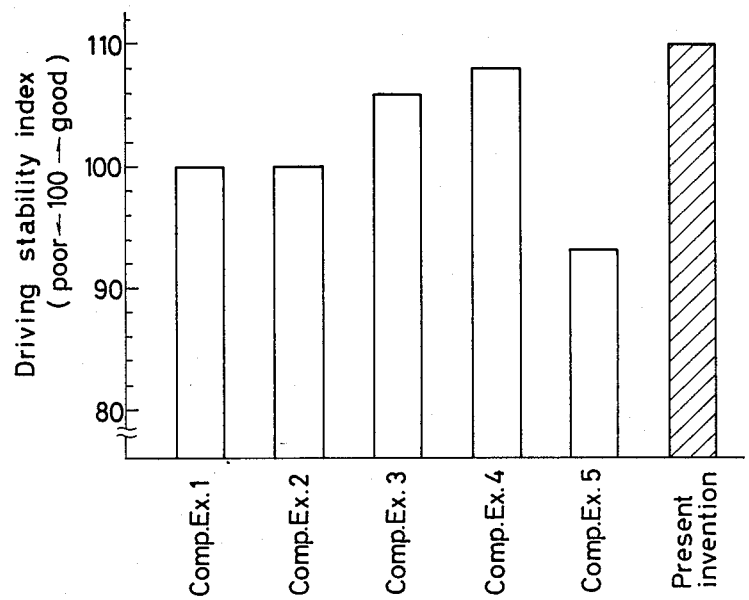
Figure 9:
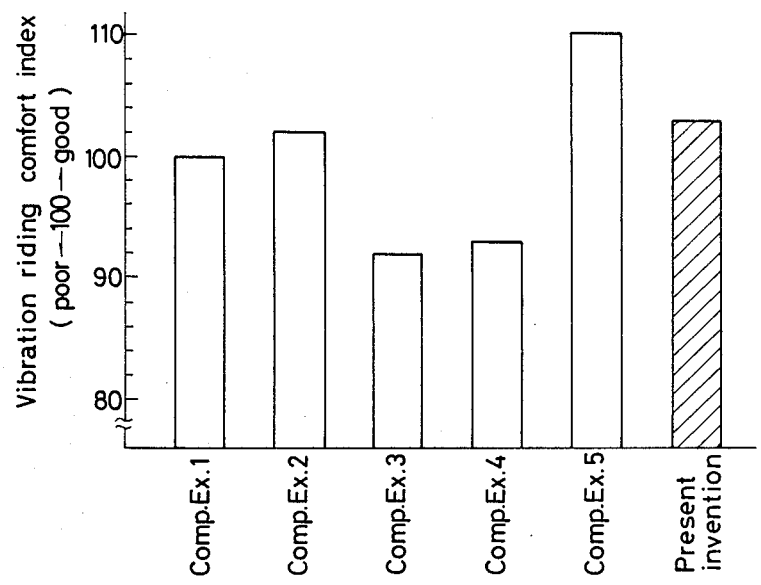
Figure 10:
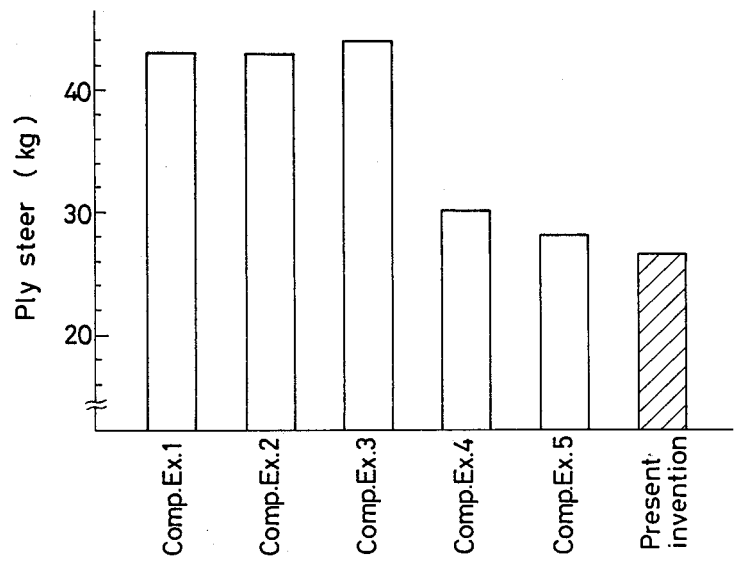

FIG. 1(A) is a cross-sectional view in the radial direction of one form of the pneumatic radial tire according to the present invention. In the drawing, the belt layer has a two-layer structure comprised of a lower belt layer 2 and an upper belt layer 3 which are provided under the tread face 4. When one of these two belt layers is made of a steel cord, the other belt layer is made of an aromatic polyamide fiber (aramid fiber) cord. In the drawing, numeral 1 designates a carcass, and a numeral 5 designates a shoulder portion.

One of the characteristic features of the present invention resides in that the pneumatic radial tire of the present invention has a belt layer having a folded structure as shown in the typical view in FIG. 1(B).

Specifically, the lower belt layer 2 among the upper and lower belt layers respectively made of the above-mentioned particular fibers is folded back at one end thereof in the widthwise direction towards the tread side to form a folded-back portion 2a and, at the same time, to enclose one end of the upper belt layer 3 therein, while the other end thereof is laminated on the other end of the upper belt layer 3 without being folded back. On the other hand, the upper belt layer 3 is laminated without being folded back at one end thereof in the widthwise direction on the folded-back portion 2a in the widthwise direction of the lower belt layer 2, while the other end thereof is folded back towards the tread side to form a folded-back portion 3a.

In other words, when the above-mentioned steel cord and aramid fiber cord are used as the tire cords constituting the belt portion, only the formation of the above-mentioned belt structure can provide an excellent balance in respect of high speed performance and durability, driving stability, and riding comfort and can decrease the ply steer.

Although the steel cord constituting a belt material of a radial tire of the present invention is not particularly limited, it is preferably one having a steel filament diameter of 0.12 to 0.20 mm, a total number of steel filaments of 9 to 21, a strand pitch of 2.5 to 7.7, a cord pitch of 3 to 10 mm, a cord structure comprised of 3×3, 4×4, or 3×7, and an elongation of 4 to 8%.

The aromatic polyamide fiber cord is preferably one having a total denier of 2000 to 4500, and a number of twists of 25 turns/10 cm to 50 turns/10 cm.

It is preferred that the steel cords and the aromatic polyamide fiber cords cross each other at an angle ranging from 20° to 27° to the circumferential direction of the tire, to form a belt portion.

It is necessary that the tire of the present invention be mounted on a vehicle so that the folded-back portion of a belt layer comprised of a steel cord [i.e., folded-back portion 3a when the upper belt layer 3 is comprised of a steel cord in FIG. 1(A)] is located in the outside of the tire. Specifically, the roadcontacting properties (uniformity of the road-contacting area) of the tire when a vehicle is rolled by cornering can be improved by mounting the tires in such a manner that the folded-back portion of the upper belt layer 3 having a high stiffness is located in the outside of each tire.

The term "radial tire" as used in the present invention is intended to mean not only a tire in which carcass cords are provided at right angles to the circumferential direction of the tire but also a tire in which the carcass cords are provided at an angle of 72° to 90° to the circumferential direction of the tire.

The effects of the present invention will now be described in detail with reference to the following examples and comparative examples.

EXAMPLE 1 AND COMPARATIVE EXAMPLES 1 TO 5

Six kinds of tires having the same time size, i.e., a tire size of 205/50VR15, and respectively having belt portions of the structures as shown in FIGS. 1 to 6 were prepared and were evaluated on the high speed performance and durability, driving stability, riding comfort, and ply steer. The results are shown in Table 1 and FIGS. 7 to 10.

The high speed performance and durability, driving stability, riding comfort, and ply steer were evaluated by the following methods.

High speed performance and durability:

The high speed performance and durability were evaluated by conducting a test using an indoor drum tester (drum diameter: 1707.6 mm) under the following conditions (extension of former FMVSS #109 "High Speed Qualification Test"): an air pressure of 2.4 kg/cm$^2$; a load of 452 kg; and a rim of 6-JJ×15 and then stepping up the speed from 121 km/hr by 8 km/hr every 30 min to continue the test until the tire is damaged. The results are shown in Table 1 and FIG. 7.

Driving Stability

Test tires mounted on a wheel rim of 6-JJ×15 and having an air pressure of 2.0 kg/cm$^2$ were mounted on an evaluation test vehicle. One person took the vehicle, and the vehicle was travelled on a dry road. The feeling of the driving stability during traveling was evaluated. The results are shown in Table 1 and FIG. 8.

Vibration Riding Comfort

A protrusion crossing tester in which a semicircular protrusion having a diameter of 20 mm was arranged in one place on a drum having a diameter of 2500 mm was used in this test. The axial force in the fore-and-aft directions was detected when a test tire crossed the above-mentioned protrusion. The magnitude of the axial force was taken as a value representing the riding comfort. The results are shown in Table 1 and FIG. 9.

The above test on the riding comfort was conducted under the following conditions: a tire size of 205/50VR15; an air pressure of 2.0 kg/cm$^2$; and a rim of 6-JJ×15.

Ply Steer

The ply steer was evaluated by the uniformity testing method as described in JASO C-607. The results are shown in Table 1 and FIG. 10.

As can be seen from Table 1 and FIGS. 7 to 10, the tire of the present invention is superior in all of the high speed performance and durability, driving stability, riding comfort, and ply steer to conventional tires. Further, a comparative tire having a belt portion which has the same structure as that of the tire of the present invention but is formed of upper and lower belt layers made of the same kind of cord, i.e., either steel cord or "Kevlar" cord does not exhibit any remarkable improvement in the balance of the performances unlike the tire of the present invention.

TABLE 1

|  | Comp. Ex. 1 | Comp. Ex. 2 | Comp. Ex. 3 | Comp. Ex. 4 | Comp. Ex. 5 | Ex. 1 |
|---|---|---|---|---|---|---|
| structure of belt portion | FIG. 2 | FIG. 3 | FIG. 4 | FIG. 5 | FIG. 6 | FIG. 1 |
| belt material | "Kevlar" 1500D/2,22° Steel 2 + 7(0.22),22° | "Kevlar" 1500D/2,22° Steel 2 + 7(0.22),22° | Steel 3 × 7(0.15),22° Steel 1 × 5(0.25),22° | Steel 3 × 7(0.15) 22° | "Kevlar" 1500D/2 22° | Steel 3 × 7(0.15),22° "Kevlar" 1500D/2,22° |
| high speed performance and durability | 257 × 15' | 265 × 20' | 289 × 3' | 281 × 4' | 273 × 20' | 281 × 6' |
| driving stability index | 100 | 100 | 106 | 108 | 93 | 110 |
| vibration riding comfort index | 100 | 102 | 92 | 93 | 110 | 103 |
| ply steer (kg) | 43.0 (100) | 42.5 (99) | 44.0 (102) | 30.1 (70) | 28.2 (66) | 26.5 (62) |

We claim:

1. A four-wheel automotive vehicle including two front wheels adapted for steering the vehicle and two rear wheels, each of said front and rear wheels having an inner side facing the vehicle, an outer side facing away from the vehicle and a pneumatic tire mounted thereon, wherein the improvement comprises: four essentially identical pneumatic radial tires mounted on said wheels, each of said pneumatic radial tires having a belt structure comprised of a belt layer made of steel cords and a belt layer made of aromatic polyamide fiber cords, wherein one of said belt layers constitutes a lower belt layer of said belt structure and the other of said belt layers constitutes an upper belt layer of said belt structure, said lower belt layer is folded back at one end thereof in the widthwise direction towards a tread side to form a folded-back portion and to enclose one end of the upper belt layer therein, the other end of said upper belt layer of said belt structure is folded back in the widthwise direction towards the tread side, and each of said pneumatic radial tires is mounted on one of said wheels with the folded-back portion of said belt layer made of steel cords located towards said outer side of the wheel, whereby said tires reduce steering pull during high speed performance of the vehicle.

2. A pneumatic radial tire according to claim 1, wherein said lower belt layer of each of said tires is made of aromatic polyamide fiber cord and said upper belt layer is made of steel fiber cords.

* * * * *